(12) United States Patent
Reardon et al.

(10) Patent No.: US 11,920,831 B2
(45) Date of Patent: Mar. 5, 2024

(54) HEATING UNIT WITH A PARTITION

(71) Applicant: Johnson Controls Technology Company, Auburn Hills, MI (US)

(72) Inventors: Anthony J. Reardon, Moore, OK (US); Praveen M. Gotakhindi, Pune (IN); Sriram Ramanujam, Pune (IN); Karan Garg, Pune (IN); Sumedh J. Suryawanshi, Pune (IN); Jim George, Pune (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 460 days.

(21) Appl. No.: 16/366,750

(22) Filed: Mar. 27, 2019

(65) Prior Publication Data

US 2020/0309414 A1    Oct. 1, 2020

Related U.S. Application Data

(60) Provisional application No. 62/823,237, filed on Mar. 25, 2019.

(51) Int. Cl.
*F24H 9/20* (2022.01)
*F24D 19/10* (2006.01)
*F24H 3/04* (2022.01)
*F24H 9/00* (2022.01)
*F24H 15/204* (2022.01)
*F24H 15/242* (2022.01)
*F24H 15/254* (2022.01)
*F24H 15/33* (2022.01)
*F24H 15/345* (2022.01)
*F24H 15/37* (2022.01)
*F24H 15/375* (2022.01)
*F24H 15/414* (2022.01)

(52) U.S. Cl.
CPC ....... *F24H 9/2071* (2013.01); *F24D 19/1087* (2013.01); *F24H 3/0411* (2013.01); *F24H 9/0057* (2013.01); *F24H 15/204* (2022.01); *F24H 15/242* (2022.01); *F24H 15/254* (2022.01); *F24H 15/33* (2022.01); *F24H 15/345* (2022.01); *F24H 15/37* (2022.01); *F24H 15/375* (2022.01); *F24H 15/414* (2022.01)

(58) Field of Classification Search
None
See application file for complete search history.

(56) References Cited

U.S. PATENT DOCUMENTS

| | | | |
|---|---|---|---|
| 3,733,849 A * | 5/1973 | Cantagallo | F25D 19/003 62/414 |
| 4,691,531 A * | 9/1987 | Clifton | F24F 3/00 62/263 |
| 6,370,899 B1 | 4/2002 | Hobbs et al. | |
| 6,651,037 B1 | 11/2003 | Hall et al. | |

(Continued)

Primary Examiner — Thor S Campbell
(74) Attorney, Agent, or Firm — Fletcher Yoder, PC

(57) ABSTRACT

A heating unit for a heating, ventilation and/or air conditioning (HVAC) system may have a first airflow path through the heating unit, a second airflow path through the heating unit, and a heater assembly having a first heating coil positioned within the first airflow path, a second heating coil positioned within the second airflow path, and a coil divider separating the first heating coil and the second heating coil.

25 Claims, 8 Drawing Sheets

(56) References Cited

U.S. PATENT DOCUMENTS

| | | | |
|---|---|---|---|
| 6,792,766 B2* | 9/2004 | Osborne | F24F 3/00 62/159 |
| 6,950,606 B2* | 9/2005 | Logan | F24H 3/0405 392/360 |
| 7,206,724 B2 | 4/2007 | Chen | |
| 7,255,532 B2 | 8/2007 | Zheng | |
| 7,406,835 B2* | 8/2008 | Allen | F28D 1/0443 123/41.02 |
| 7,558,649 B1 | 7/2009 | Sharma et al. | |
| 8,348,732 B2* | 1/2013 | Aronstam | F24F 3/00 454/256 |
| 8,746,584 B2* | 6/2014 | Helt | F24H 3/002 237/2 A |
| 8,837,922 B2* | 9/2014 | Mulder | F24D 5/02 392/347 |
| 9,121,620 B2* | 9/2015 | Rohde | F24F 13/10 |
| 9,740,801 B2 | 8/2017 | Singh et al. | |
| 9,968,013 B2* | 5/2018 | Cacho Alonso | H05K 7/20609 |
| 10,046,616 B2* | 8/2018 | Shin | B60H 1/22 |
| 2008/0052952 A1* | 3/2008 | Nelson | A47K 10/48 34/554 |
| 2008/0202138 A1* | 8/2008 | Pabisz | B63J 2/04 62/240 |
| 2010/0326624 A1* | 12/2010 | Hancock | F24F 3/044 165/47 |
| 2012/0072181 A1 | 3/2012 | Imani | |
| 2012/0168119 A1* | 7/2012 | Dunnavant | H05K 7/20745 165/59 |
| 2013/0023198 A1* | 1/2013 | Badenhorst | F24F 13/06 454/269 |
| 2013/0035794 A1 | 2/2013 | Imani | |
| 2014/0260408 A1* | 9/2014 | Dempsey | F24F 7/007 62/407 |
| 2015/0082820 A1* | 3/2015 | Takahashi | B60H 1/00035 62/238.7 |
| 2015/0134123 A1 | 5/2015 | Obinelo | |
| 2016/0040907 A1* | 2/2016 | Powell | F24D 19/1096 237/2 A |
| 2016/0137023 A1* | 5/2016 | Park | B60H 1/26 165/42 |
| 2016/0229266 A1* | 8/2016 | Maeda | B60H 1/00849 |
| 2016/0303941 A1* | 10/2016 | Kinmartin | B60H 1/00064 |
| 2017/0241653 A1* | 8/2017 | Henderson | F24F 11/77 |
| 2018/0292105 A1 | 10/2018 | Balakrishna et al. | |
| 2020/0248929 A1* | 8/2020 | Hoyt | F24F 1/0063 |
| 2020/0378644 A1* | 12/2020 | Reardon | F24F 11/70 |
| 2021/0285682 A1* | 9/2021 | Martin, Sr. | F24F 11/85 |
| 2022/0146122 A1* | 5/2022 | Stegall | F28D 1/0443 |

\* cited by examiner

HEATING UNIT WITH A PARTITION

CROSS-REFERENCE TO RELATED APPLICATIONS

This application claims priority from and the benefit of U.S. Provisional Application Ser. No. 62/823,237, entitled "HEATING UNIT WITH A PARTITION," filed Mar. 25, 2019, which is herein incorporated by reference in its entirety for all purposes.

BACKGROUND

The present disclosure relates generally to a heating, ventilation, and/or air conditioning (HVAC) system, and more particularly, to a heating unit having a partition plate.

HVAC systems are utilized in residential, commercial, and industrial environments to control environmental properties, such as temperature and humidity, for occupants of the respective environments. The HVAC system may control the environmental properties through the control of an airflow delivered to the environment. For example, a heating unit of an HVAC system may have multiple blowers configured to direct respective airflows across heating elements to condition each airflow delivered to the environment. In some instances, directing multiple airflows through the HVAC unit may create heat imbalances between each airflow as each airflow passes through respective heating elements. As such, it may be desirable to reduce uneven heating between each airflow directed by respective blowers through the heating unit.

DRAWINGS

SUMMARY

Figure 1:
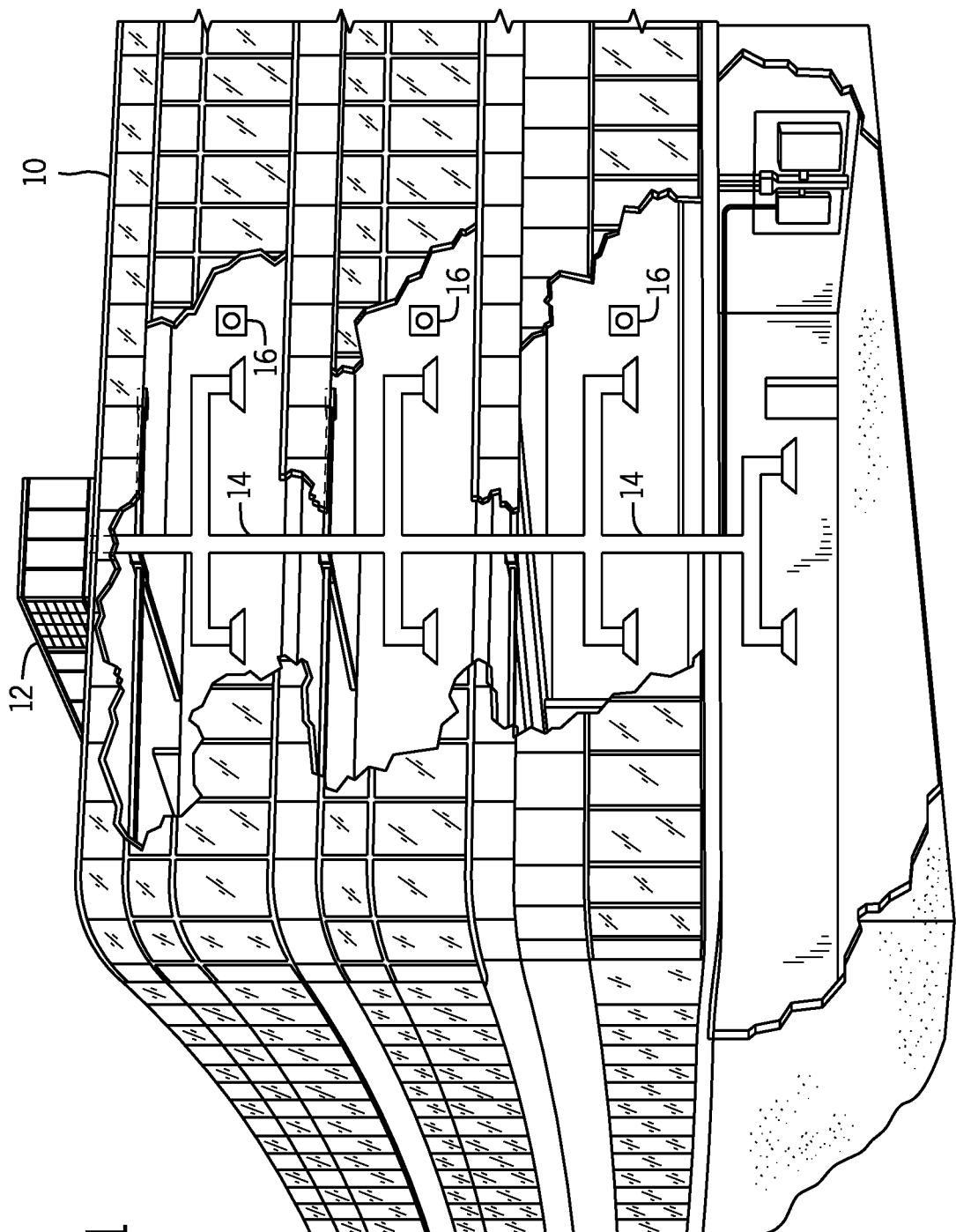
FIG. 1 is a schematic of an embodiment of an HVAC system for building environmental management that includes an HVAC unit, in accordance with an aspect of the present disclosure.

In one embodiment of the present disclosure, a heating unit for a heating, ventilation and/or air conditioning (HVAC) system may have a first airflow path through the heating unit, a second airflow path through the heating unit, and a heater assembly having a first heating coil positioned within the first airflow path, a second heating coil positioned within the second airflow path, and a coil divider separating the first heating coil and the second heating coil.

In another embodiment of the present disclosure, a heating unit for a heating, ventilation and/or air conditioning (HVAC) system may have a first blower that may direct a first airflow along a first airflow path through the heating unit, a second blower that may direct a second airflow along a second airflow path through the heating unit, a heater assembly having a first heating coil positioned within the first airflow path, a second heating coil positioned within the second airflow path, and a coil divider separating the first heating coil and the second heating coil, and a partition that may abut the coil divider and separate the first airflow path and the second airflow path within the heating unit upstream of the heater assembly.

In a further embodiment of the present disclosure, a heating unit of a heating, ventilation and/or air conditioning (HVAC) system may have a heater assembly having a first heating coil positioned within a first airflow path through the heating unit, a second heating coil positioned within a second airflow path through the heating unit, and a coil divider separating the first heating coil and the second heating coil. The heating unit may also have a partition abutting the coil divider and separating the first airflow path and the second airflow path within the heating unit upstream of the heater assembly.

Other features and advantages of the present application will be apparent from the following, more detailed description of the embodiments, taken in conjunction with the accompanying drawings which illustrate, by way of example, the principles of the application.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to an improved heating unit of a heating, ventilation, and/or air conditioning (HVAC) system that may reduce the potential for uneven heating between respective airflows directed through the heating unit. As mentioned above, directing multiple airflows through a heating unit with multiple blowers may create heat imbalances between each airflow. For example, as each blower of the heating unit directs an airflow through a respective set of heating elements associated with the heating unit, a portion of each airflow may comingle with other airflows before passing through the corresponding set of heating elements. As such, an airflow may have a greater amount of air passing through respective heating elements than other airflows directed through the heating unit, thereby increasing the potential of uneven heating between each airflow passing through respective sets of heating elements associated with the heating unit.

Accordingly, embodiments of the present disclosure are directed to an improved heating unit that minimizes the comingling of air between airflows within the heating unit upstream of the respective sets of heating elements disposed within the heating unit. For example, a heating unit may include a heater assembly that has a first heating coil positioned within a first airflow path through the heating unit, a second heating coil positioned within a second airflow path through the heating unit, and a coil divider separating the first heating coil and the second heating coil. The heating unit may also have a partition, such as a partition plate, configured to abut the coil divider and separate the first airflow path and the second airflow path within the heating unit upstream of the heater assembly. As multiple airflows are directed along respective airflow paths through the heating unit by respective blowers, the partition may minimize the amount of air that may pass between each airflow and adjacent airflows upstream of the heater assembly. For example, in a heating unit having two blowers, the partition may block air from a first airflow directed along the first airflow path from comingling with a second airflow directed along the second airflow path, block air from the second airflow directed along the second airflow path from comingling with the first airflow directed along the first airflow path, or both. In this way, the heating unit may substantially maintain the amount of air within each airflow being directed along each airflow path toward respective heating coils, thereby minimizing the potential of uneven heating between the airflows after passing through the respective heating coils. As a result, the heating unit may provide a more accurate and consistent amount of conditioning to the air supplied to a building from the heating unit.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
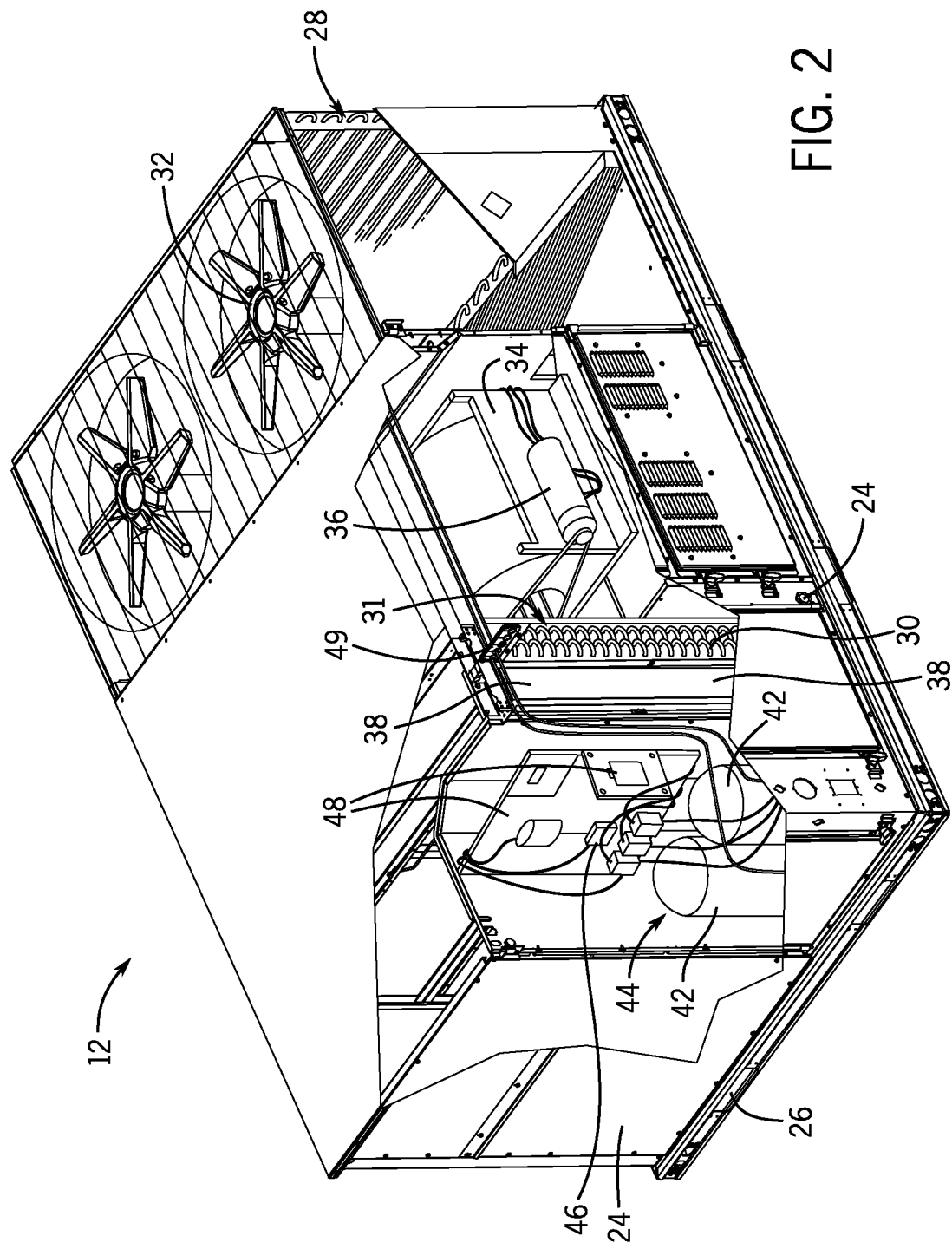
FIG. 2 is a perspective view of an embodiment of an HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
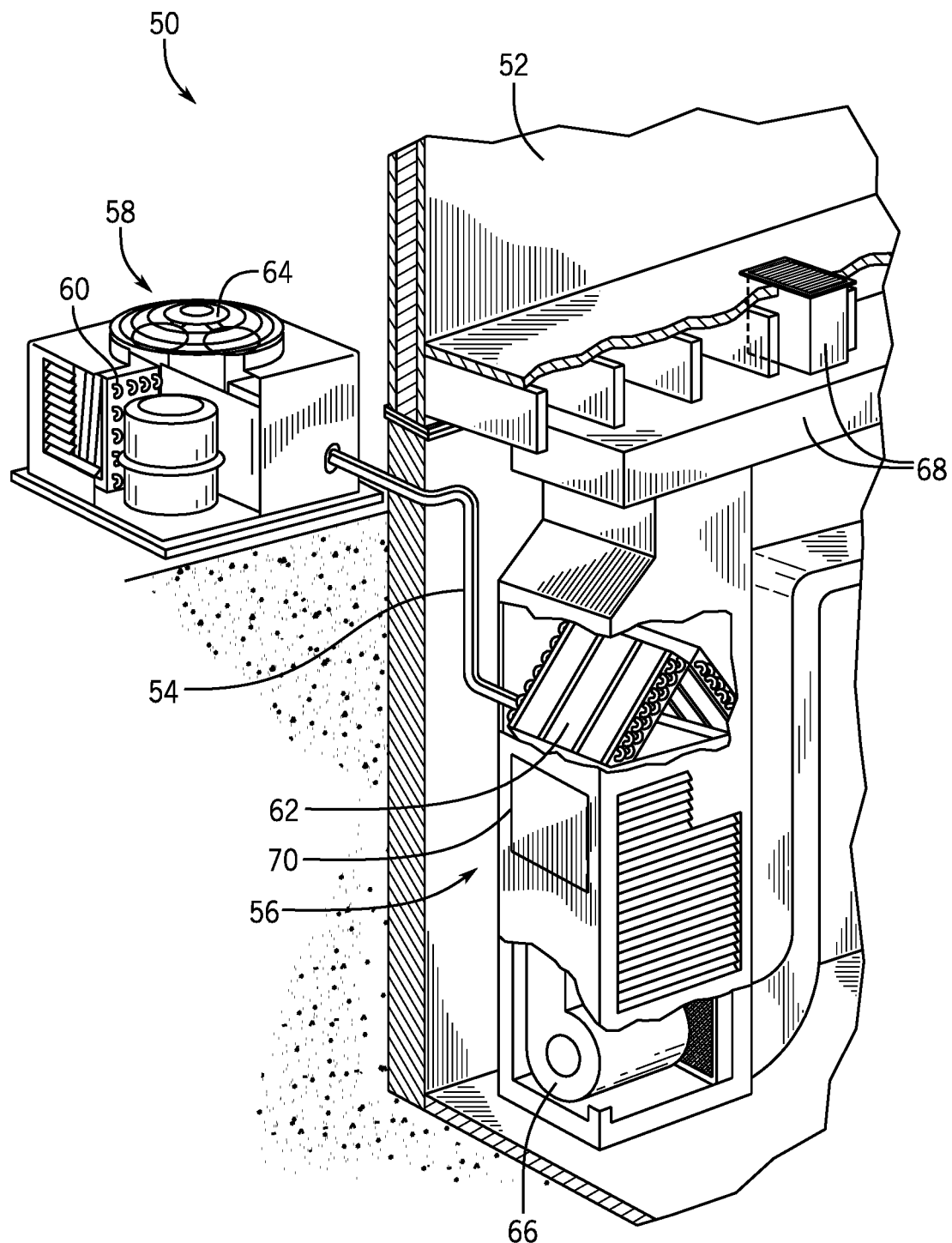
FIG. 3 is a cutaway, perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
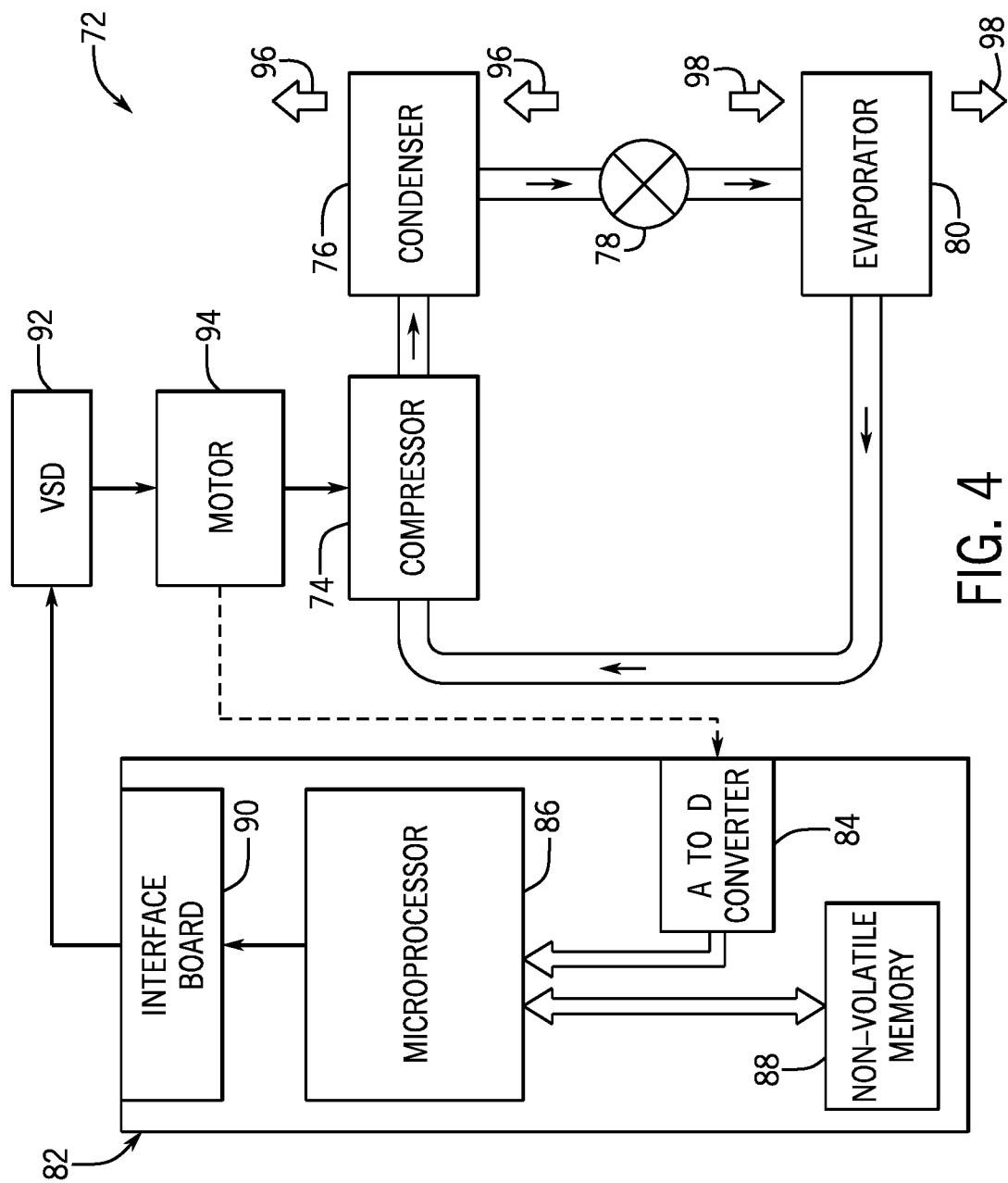
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, embodiments of the present disclosure are directed to a heating unit that minimizes the comingling of air between airflows within a heating unit upstream of respective sets of heating elements disposed within the heating unit. For example, a heating unit may include a heater assembly that has a first heating coil positioned within a first airflow path through the heating unit, a second heating coil positioned within a second airflow path through the heating unit, and a coil divider separating the first heating coil and the second heating coil. The heating unit may also have a partition, such as a partition plate, configured to abut the coil divider and separate the first airflow path and the second airflow path within the heating unit upstream of the heater assembly. As each airflow is directed through the heating unit by respective blowers along the first airflow path and the second airflow path, the partition may minimize the amount of air that may pass between each airflow and adjacent airflows upstream of the heater assembly. That is, the amount of air being directed along each airflow path is substantially maintained from the blower to the heater assembly. In this way, the heating unit may minimize the potential of uneven heating between the airflows after the airflows pass through respective heating coils of the heater assembly.

Although embodiments of the present disclosure are described with reference to a heating unit having two blowers, or a dual-blower heating unit, it should be understood that, in other embodiments, the heating unit may have more than two blowers. In such embodiments, the heating unit may have two or more partitions that separate adjacent airflows directed through the heating unit from respective blowers upstream of the heater assembly. For example, in a heating unit having three blowers, the heating unit may have a heater assembly that has a first heating coil positioned within a first airflow path through the heating unit, a second heating coil positioned within a second airflow path through the heating unit, a third heating coil positioned with a third airflow path through the heating unit, a first coil divider separating the first heating coil and the second heating coil, and a second coil divider separating the second heating coil and the third heating coil. The heating unit may have a first partition configured to abut the first coil divider and separate the first airflow path and the second airflow path upstream of the heater assembly and a second partition configured to abut the second coil divider and separate the second airflow path and the third airflow path upstream of the heater assembly.

Figure 5:
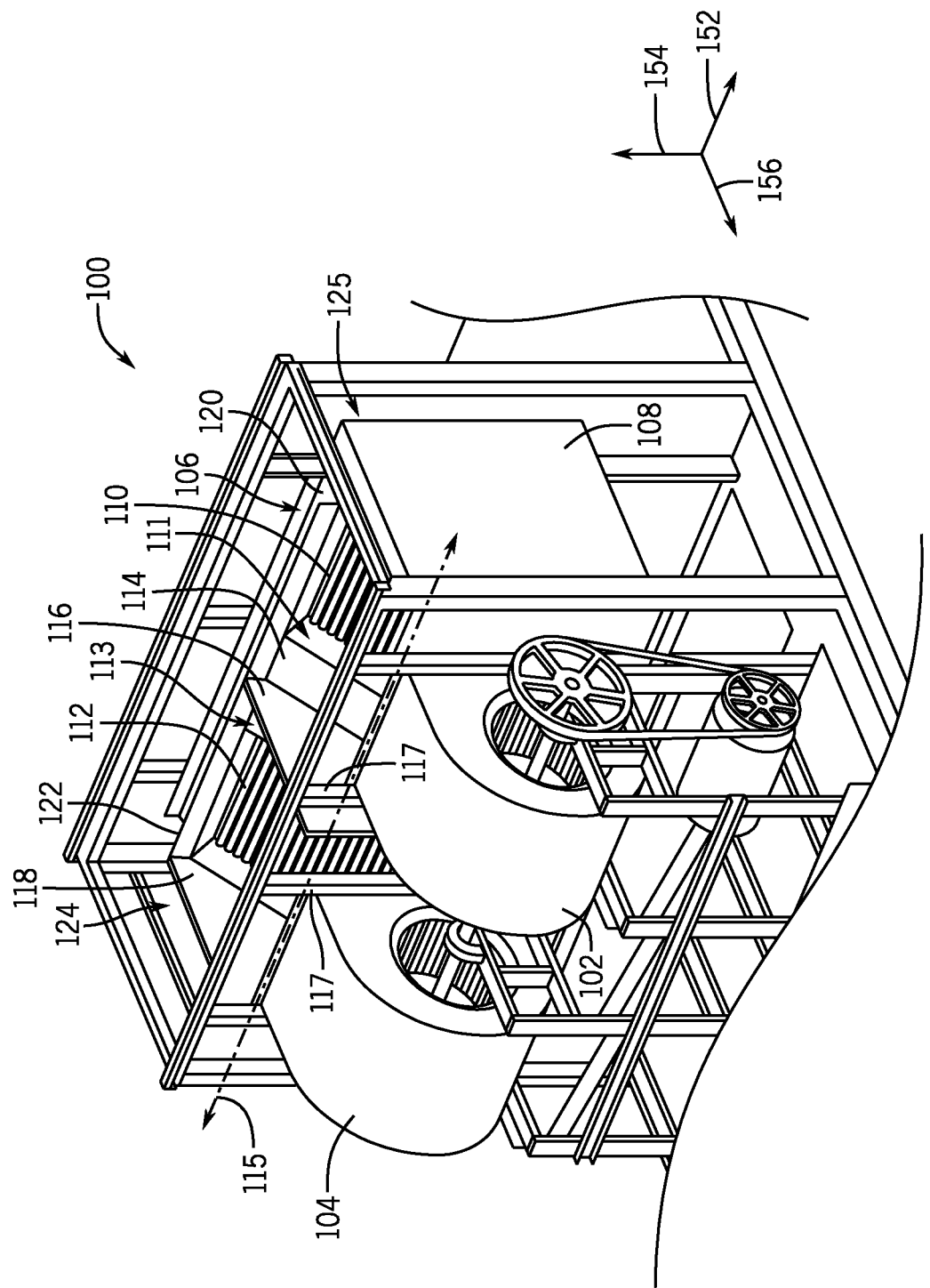
FIG. 5 is a perspective view of an embodiment of a heating unit and a heater assembly disposed within the heating unit, in accordance with an aspect of the present disclosure.

To facilitate discussion of FIGS. 5-8, a heating unit 100 and its components are described with reference to a longitudinal axis or direction 152, a vertical axis or direction 154, and a lateral axis or direction 156. With the foregoing in mind, FIG. 5 is a perspective view of various components of the heating unit 100, which may be incorporated with the HVAC unit 12, such as a rooftop unit (RTU) or a pad mounted unit associated with the building 10. In the illustrated embodiment, the heating unit 100 includes a heater assembly 106 that has a first heating coil 110 and a second heating coil 112 separated by a coil divider 114. In some embodiments, the heater assembly 106 may be an electric heater assembly, and the first heating coil 110 and the second heating coil 112 may generate heat via electricity. The operation of the heater assembly 106 may be controlled by processing circuitry within a controller enclosure 108 mounted to the heater assembly 106. For example, the processing circuitry within the controller enclosure 108 may regulate the operation, such as a temperature setting, of the first heating coil 110 and the second heating coil 112 to provide heat to respective airflows driven through the first heating coil 110 and the second heating coil 112 before the respective airflows are supplied to the building 10. In some embodiments, the processing circuitry within the controller enclosure 108 may independently control the operation of the first heating coil 110 and the second heating coil 112 to provide heat to the respective airflows driven through the first heating coil 110 and the second heating coil 112. For example, the processing circuitry may set the temperature setting of the first heating coil 110 independently of the temperature setting of the second heating coil 112. In other embodiments, the processing circuitry may control the operation of the first heating coil 110 and the second heating coil 112 together to provide heat to the respective airflows driven through the first heating coil 110 and the second heating coil 112.

The heater assembly 106 may be coupled to a mounting rail 120 that extends along a length 115 of the heating unit 100 in the longitudinal direction 152. The heater assembly 106 may be positioned within the heating unit 100 at an oblique angle relative to a lateral direction 156 of airflow through the heating unit 100. By angling the heater assembly 106, a surface area of the first heating coil 110 and a surface area of the second heating coil 112 may be increased relative to positions of heater assemblies at non-oblique angles relative the lateral direction 156 of airflow through the heating unit 100. Additional details with regard to the angle of the heater assembly 106 may be discussed below with reference to FIG. 8.

The heating unit 100 may include a first blower 102 that directs a first airflow along a first airflow path of the heating unit 100 toward the first heating coil 110 and a second blower 104 that directs a second airflow along a second airflow path of the heating unit 100 toward the second heating coil 112. As the first airflow and the second airflow are driven toward the first heating coil 110 and the second heating coil 112, respectively, a partition 116 mounted within the heating unit 100 may separate the first airflow and the second airflow upstream of the first heating coil 110 and the second heating coil 112. In this way, the amount of air in the first airflow is substantially maintained as the first airflow is driven by the first blower 102 through the first heating coil 110, and the amount of air in the second airflow is substantially maintained as the second airflow is driven by the second blower 104 through the second heating coil 112. Additional details with regard to the first airflow path and the second airflow path may be discussed below with reference to FIGS. 6 and 7.

The partition 116 may abut the coil divider 114 of the heater assembly 106 within the heating unit 100. In one embodiment, the partition 116 may have a gasket made of foam, rubber, or another suitable material that is tolerant to high temperatures that may be present within the heating unit 100. The gasket may line an edge of the partition 116 that may abut the coil divider 114. In another embodiment, the partition 116 may be mounted within the heating unit 100 using a support rail, such as a vertical rail 117, a ceiling rail, or both. In any case, the partition 116 may abut the coil divider 114, such that the partition 116 separates the first airflow path from the second airflow path upstream of the heater assembly 106.

The partition 116 may also separate the coil divider 114, such that a portion of the coil divider 114 is present on either side of the partition 116. For example, the partition 116 may split the coil divider 114 into a first portion 111 proximate to the first heating coil 110 and a second portion 113 proximate to the second heating coil 112. As the first blower 102 drives the first airflow toward the first heating coil 110, the first portion 111 of the coil divider 114 may direct the first airflow through the first heating coil 110. Similarly, as the second blower 104 drives the first airflow toward the second heating coil 112, the second portion 113 may direct the second airflow through the second heating coil 112. In some embodiments, the first portion 111 of the coil divider 114 and the second portion 113 of the coil divider 114 may each have one or more surfaces that may direct air toward the first heating coil 110 and the second heating coil 112, respectively, after the air contacts the surfaces. For example, the first portion 111 of the coil divider 114 may have an angled surface that slants toward the first heating coil 110, and the second portion 113 of the coil divider 114 may have an angled surface that slants toward the second heating coil 112. As such, each portion 111, 113 of the coil divider 114 may direct air from respective airflows toward the heating coil portions 110, 112 of the heater assembly 106.

In some embodiments, the partition 116 may have a substantially triangular profile based on the oblique angle of the heater assembly 106 relative to the lateral direction 156 of airflow through the heating unit 100. For example, a cross-section of the partition 116 in the lateral direction 156 may have a substantially triangular shape. Although the partition 116 is illustrated as having a substantially triangular profile in FIG. 5, it should be understood that the partition 116 may have any suitable geometry to facilitate separation of the first airflow and the second airflow upstream of the first heating coil 110 and the second heating coil 112. For example, the geometrical profile of the partition 116 may be at least partially defined by various components of the heating unit 100, such as one or more support rails that may be fastened to the partition 116 or the coil divider 114 that may abut the partition 116. As such, in some embodiments, the geometrical profile of the partition 116 may have four sides, five sides, six sides, seven sides or more. The partition 116 may also have one or more rounded or curved vertices 170. In the illustrated embodiment, for example, the triangular profile of the partition 116 may have two curved vertices 170. In other embodiments, the triangular profile of the partition 116 may have no curved vertices, one curved vertex, or three curved vertices.

The heating unit 100 may also have a side panel 118 that may abut the second heating coil 112 at a peripheral edge 124 of the heater assembly 106. Similar to the partition 116, the side panel 118 may have a gasket made of foam, rubber, or another suitable material that is tolerant to high temperatures. The gasket may line the side panel 118 along an edge of the side panel 118 that may abut the second heating coil 112 at the peripheral edge 124 of the heater assembly 106. In another embodiment, the side panel 118 may be mounted within the heating unit 100 using a support rail, such as a vertical rail, a ceiling rail, or both. In any case, the side panel 118 may help direct the second airflow toward the second heating coil 112 along the second airflow path. For example, the side panel 118 may block air from the second airflow from bypassing the second heating coil 112 by flowing around the peripheral edge 124 of the heater assembly 106. Similarly, the controller enclosure 108 may abut the first heating coil 110 at a peripheral edge 125 of the heater assembly 106. The controller enclosure 108 may help direct the first airflow toward the first heating coil 110 along the first airflow path. For example, the controller enclosure 108 may block air from the first airflow from bypassing the first heating coil 110 by flowing around the peripheral edge 125 of the heater assembly 106.

Additionally, the heater assembly 106 may have a block off 122, such as an air deflector, disposed toward the top of the heater assembly 106. The block off 122 may extend along the length 115 of the heater assembly 106 in the longitudinal direction 152, such that a portion of the block off 122 is present on both sides of the partition 116. For example, a first portion of the block off 122 may be proximate to the first heating coil 110, and a second portion of the block off 122 may be proximate to the second heating coil 112. The first portion of the block off 122 may help funnel the first airflow through the first heating coil 110, and the second portion of the block off 122 may help funnel the second airflow through the second heating coil 112.

Figure 6:
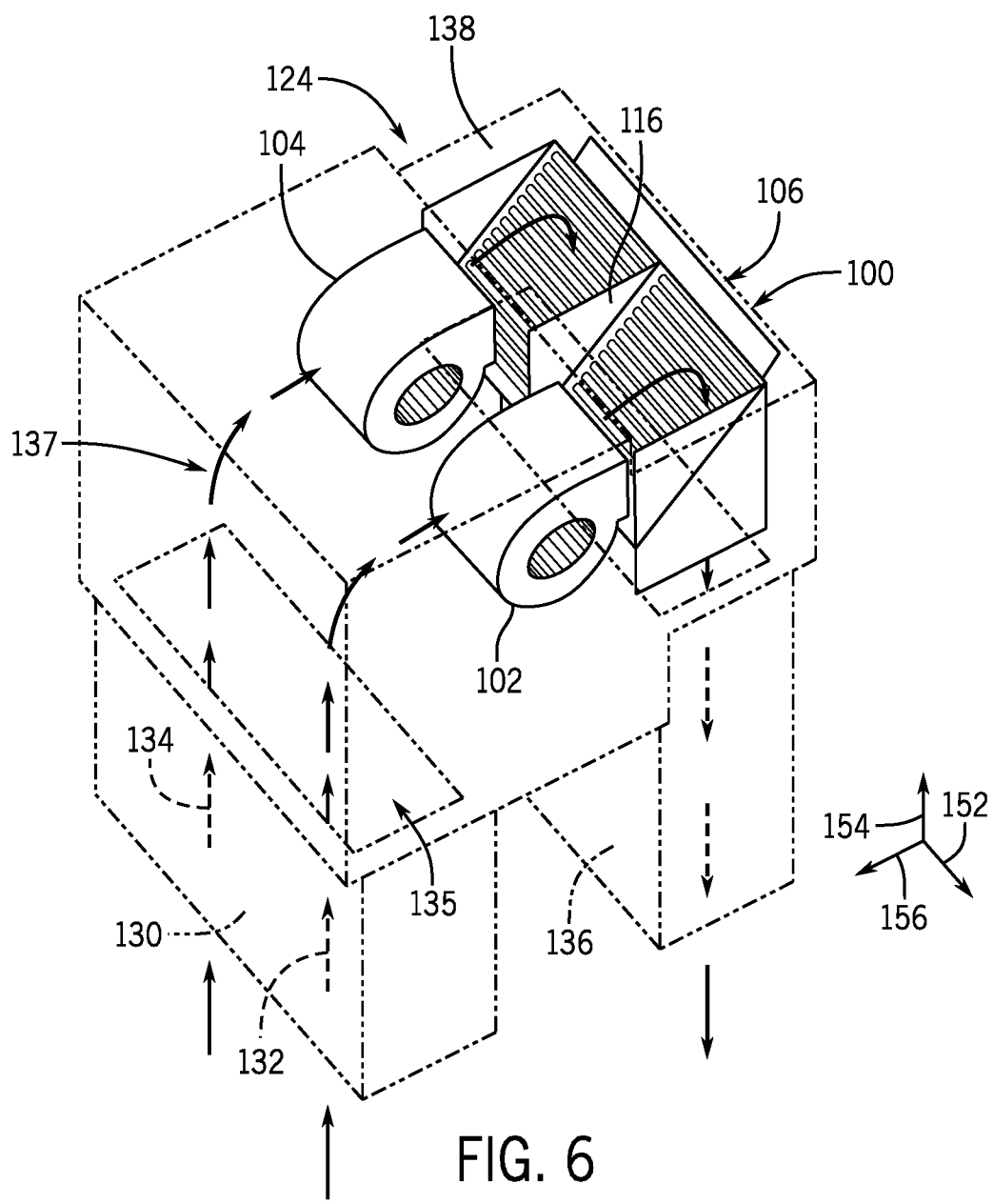
FIG. 6 is a perspective view schematic of an embodiment of the heating unit of FIG. 5 in a downward discharge configuration, in accordance with an aspect of the present disclosure.

As mentioned above, the heating unit 100 includes the first blower 102 that directs the first airflow along the first airflow path toward the first heating coil 110 of the heater assembly 106 and the second blower 104 that directs the second airflow along the second airflow path toward the second heating coil 112 of the heater assembly 106. FIG. 6 is a perspective view of a first airflow path 132 and a second airflow path 134 through the heating unit 100 with the heating unit 100 having a downward discharge configuration. For example, the heating unit 100 in the downward discharge configuration may include a side panel 138 installed in the heating unit 100 at the peripheral edge 124 of the heater assembly 106. The side panel 138 may direct a first airflow 132 within the first airflow path 135 and a second airflow 134 within the second airflow path 137 downstream of the heater assembly 106 toward a base outlet 136 of the heating unit 100 in the downward discharge configuration. In some embodiments, the heating unit 100 may have the downward discharge configuration during operation as a rooftop unit (RTU) associated with the building 10. As illustrated in FIG. 6, the first blower 102 directs the first airflow 132 along the first airflow path 135 through the heating unit 100. For example, as air is drawn into the first blower 102 from an inlet 130 of the heating unit 100, the first blower 102 may increase the velocity of the first airflow 132 entering the first blower 102 and may direct the first airflow 132 along the first airflow path 135 toward the heater assembly 106. As the first airflow 132 passes through the heater assembly 106, the first airflow 132 exchanges thermal energy with heating elements of the heater assembly 106, such as the first heating coil 110. The first airflow 132 is then directed along the first airflow path 135 downward toward the base outlet 136 of the heating unit 100 before ultimately being supplied to the building 10. Similarly, the second blower 104 directs the second airflow 134 along the second airflow path 137 through the heating unit 100. For example, as air is drawn into the second blower 104 from the inlet 130 of the heating unit 100, the second blower 104 may increase the velocity of the second airflow 134 entering the second blower 104 and direct the second airflow 134 along the second airflow path 137 toward the heater assembly 106. As the second airflow 134 passes through the heater assembly 106, the second airflow 134 exchanges thermal energy with heating elements of the heater assembly 106, such as the second heating coil 112. The second airflow 134 is then directed along the second airflow path 137 downward toward the base outlet 136 of the heating unit 100 before ultimately being supplied to the building 10.

Figure 7:
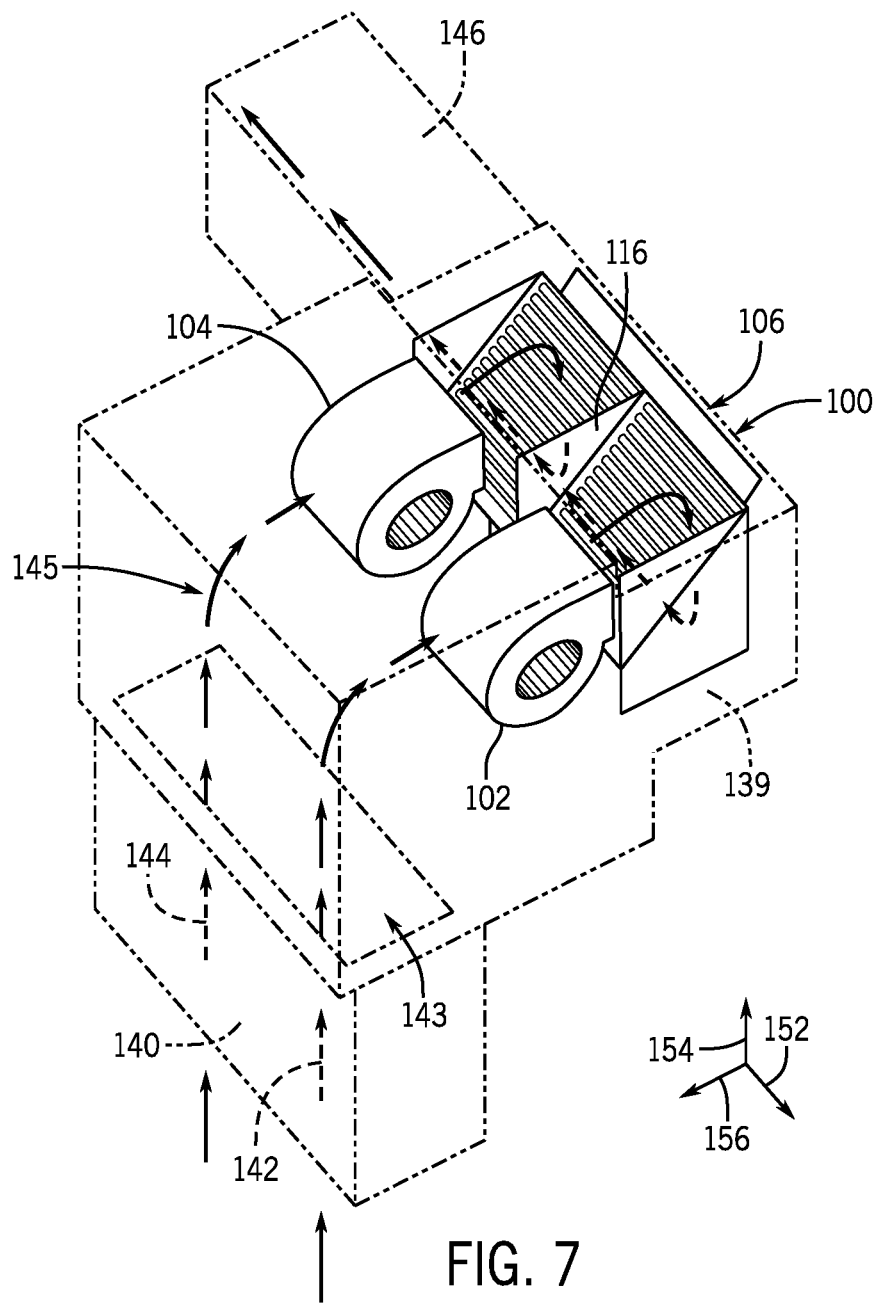
FIG. 7 is a perspective view schematic of an embodiment of the heating unit of FIG. 5 in a side discharge configuration, in accordance with an aspect of the present disclosure.

FIG. 7 is a perspective view of a first airflow path 143 and a second airflow path 145 through the heating unit 100 in a side discharge configuration of the heating unit 100. For example, in the side discharge configuration, the heating unit 100 may include a base discharge panel 139 installed in the heating unit 100 below the heater assembly 106. The base discharge panel 139 may direct a first airflow 142 within the first airflow path 143 and a second airflow 144 within the second airflow path 145 downstream of the heater assembly 106 toward a side outlet 146 of the heating unit 100 in the side discharge configuration. In some embodiments, the heating unit 100 may have the side discharge configuration during operation as a pad mounted unit associated with the building 10. As illustrated in FIG. 7, the first blower 102 directs the first airflow 142 along the first airflow path 143 through the heating unit 100. For example, as air is drawn into the first blower 102 from an inlet 140 of the heating unit 100, the first blower 102 may increase the velocity of the first airflow 142 entering the first blower 102 and may direct the first airflow 142 along the first airflow path 143 toward the heater assembly 106. As the first airflow 142 passes through the heater assembly 106, the first airflow 142 exchanges thermal energy with heating elements of the heater assembly 106, such as the first heating coil 110. The first airflow 142 is then directed along the first airflow path 143 to the side toward the side outlet 146 of the heating unit 100 before ultimately being supplied to the building 10. Similarly, the second blower 104 directs the second airflow 144 along the second airflow path 145 through the heating unit 100. For example, as air is drawn into the second blower 104 from the inlet 140 of the heating unit 100, the second blower 104 may increase the velocity of the second airflow 144 entering the second blower 104 and direct the second airflow 144 along the second airflow path 145 toward the heater assembly 106. As the second airflow 144 passes through the heater assembly 106, the second airflow 144 exchanges thermal energy with heating elements of the heater assembly 106, such as the second heating coil 112. The second airflow 144 is then directed along the second airflow path 145 to the side toward the side outlet 146 of the heating unit 100 before ultimately being supplied to the building 10.

In some embodiments, the first blower 102 and the second blower 104 may operate concurrently. As illustrated in FIGS. 6 and 7, the first blower 102 may direct the first airflow 132, 142 along the first airflow path 135, 143 and the second blower 104 may direct the second airflow 134, 144 along the second airflow path 137, 145, concurrently. After the first airflow 132, 142 and the second airflow 134, 144 pass through the heater assembly 106, a portion of the first airflow 132, 142 and a portion of the second airflow 134, 144 may comingle downstream of the heater assembly 106 before the first airflow 132, 142 and the second airflow 134, 144 are supplied to the building 10. In other embodiments, the first blower 102 and the second blower 104 may operate at different times. For example, the first blower 102 may direct the first airflow 132, 142 along the first airflow path 135, 143 or the second blower 104 may direct the second airflow 134, 144 along the second airflow path 137, 145 during different periods of time. After the first airflow 132, 142 or the second airflow 134, 144 passes through the heating assembly 106, the first airflow 132, 142 or the second airflow 134, 144 may be supplied to the building 10.

Figure 8:
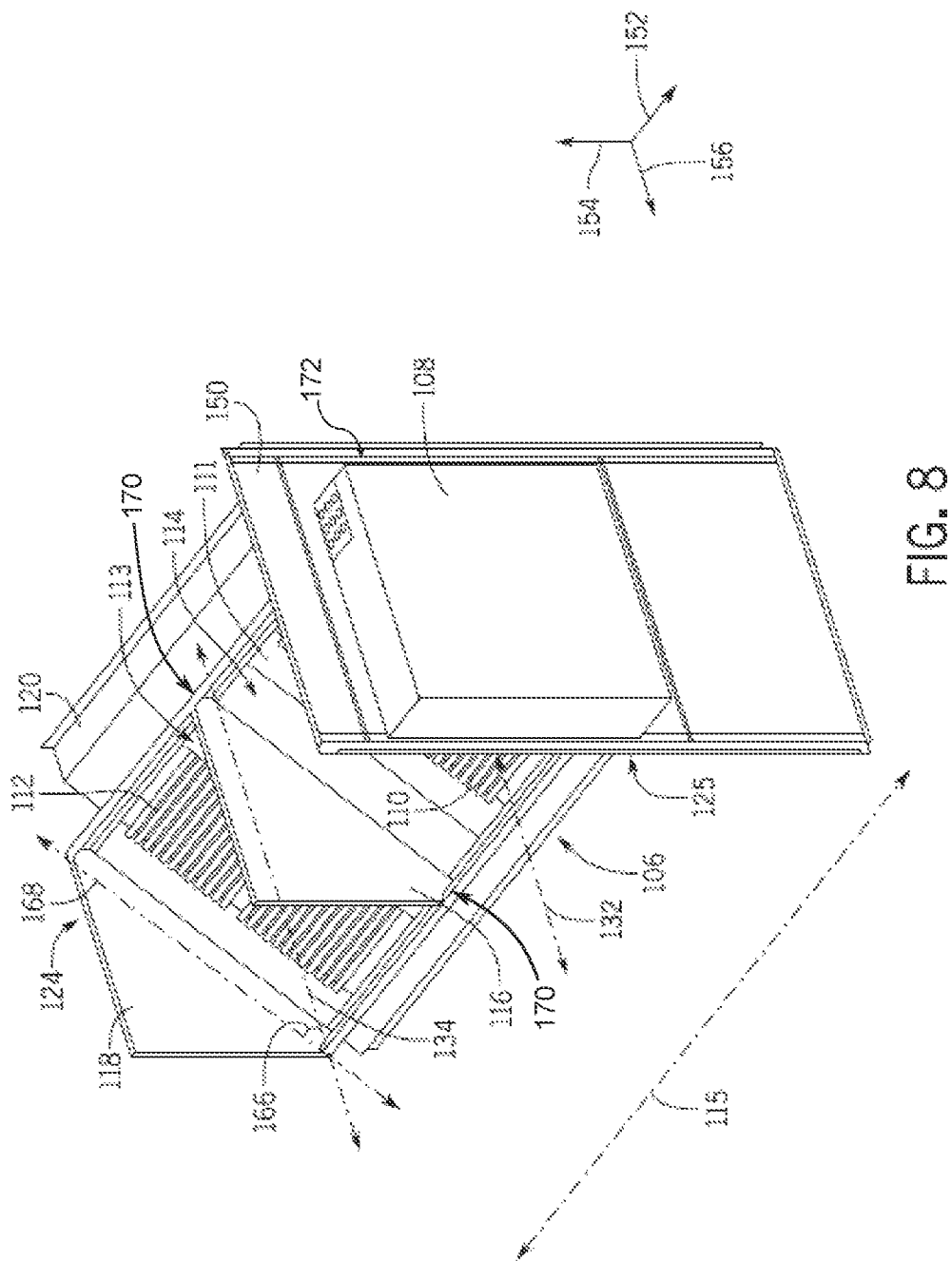
FIG. 8 is a perspective view of an embodiment of the heater assembly of FIG. 5 mounted to a controller enclosure, in accordance with an aspect of the present disclosure.

FIG. 8 is a perspective view of various components of the heater assembly 106 that may be mounted within the heating unit 100. As described above, the heater assembly 106 has the first heating coil 110 and the second heating coil 112 separated by the coil divider 114. The heater assembly 106 may be coupled to the mounting rail 120 that extends along the length 115 of the heating unit 100 in the longitudinal direction 152. The operation of the heater assembly 106 may be controlled by processing circuitry within the controller enclosure 108 mounted to the heater assembly 106. The controller enclosure 108 may also be coupled to a side panel 150 of the heating unit 100. In the illustrated embodiment, the heater assembly 106 may be mounted within the heating unit 100 such that the controller enclosure 108 is disposed external to the heating unit 100. For example, the side panel 150 may partially define a housing of the heating unit 100. The side panel 150 may partially separate the heater assembly 106 from the controller enclosure 108. That is, other than a portion of the heater assembly 106 that is mounted to the controller enclosure 108 through the side panel 150, other portions of the heater assembly 106 may be disposed internal to the heating unit 100. For example, the first heating coil 110, the second heating coil 112, and the coil divider 114 may be disposed within the heating unit 100 while a portion of the heater assembly 106 extending along an axis 168 at the peripheral edge 124 of the heater assembly 106 may be coupled to the controller enclosure 108 through an opening 172 in the side panel 150.

In other embodiments, the side panel 150 may be positioned within the heating unit 100. For example, the side panel 150 may partially define a compartment within the housing of the heating unit 100. In such embodiments, the controller enclosure 108 may be disposed within the compartment partially defined by the side panel 150 and within the housing of the heating unit 100. In any case, similar to the side panel 118 described above, the side panel 150 and the controller enclosure 108 may help direct the first airflow 132, 142 toward the first heating coil 110 along the first airflow path 135, 143. For example, the side panel 150 and the controller enclosure 108 may block air from the first airflow 132, 142 from bypassing the first heating coil 110 by flowing around the peripheral edge 125 of the heater assembly 106.

Referring back to FIG. 8, the heater assembly 106 may be positioned within the heating unit 100 at an oblique angle 166 relative to the lateral direction 156 of airflow through the heating unit 100. For example, the oblique angle 166 may be greater than five degrees, ten degrees, fifteen degrees, twenty degrees, thirty degrees, or any other suitable angle relative to the first airflow 132 or the second airflow 134 to facilitate conditioning of the first airflow 132, 142 along the first airflow path 135, 143 through the heating unit 100, conditioning of the second airflow 134, 144 along the second airflow path 137, 145 through the heating unit 100, or both.

As set forth above, embodiments of the present disclosure may provide one or more technical effects useful in minimizing the potential of uneven heating between airflows passing through a heating unit of an HVAC system. For example, embodiments of the present disclosure are directed to an improved heating unit that minimizes the comingling of air between airflows within the heating unit upstream of respective sets of heating elements disposed within the heating unit. For example, the heating unit may include a heater assembly that has a first heating coil positioned within a first airflow path through the heating unit, a second heating coil positioned within a second airflow path through the heating unit, and a coil divider separating the first heating coil and the second heating coil. The heating unit may also have a partition, such as a partition plate, configured to abut the coil divider and separate the first airflow path and the second airflow path within the heating unit upstream of the heater assembly. As each airflow is directed through the heating unit by respective blowers along the first airflow path and the second airflow path, the partition may minimize the amount of air that may pass between each airflow and adjacent airflows upstream of the heater assembly. That is, the amount of air being directed along each airflow path is substantially maintained from the blower to the heater assembly. In this way, the heating unit may minimize the potential of uneven heating between the airflows after the airflows pass through respective heating coils of the heater assembly.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating unit for a heating, ventilation and/or air conditioning (HVAC) system, comprising:
    a first airflow path through the heating unit;
    a second airflow path through the heating unit;
    a heater assembly including a first heating coil positioned within the first airflow path, a second heating coil positioned within the second airflow path, and a coil divider extending along a length of the heating unit from the first heating coil to the second heating coil by a distance to separate the first heating coil and the second heating coil such that the first heating coil and the second heating coil are separated from one another along the length of the heating unit by the distance, wherein the first heating coil, the second heating coil, and the coil divider are aligned with one another along the length of the heating unit;

a partition abutting the coil divider and separating the first airflow path and the second airflow path within the heating unit upstream of the heater assembly; and an outlet configured to discharge a comingled airflow comprising a first airflow directed along the first airflow path across the first heating coil and a second airflow directed along the second airflow path across the second heating coil from the heating unit.

2. The heating unit of claim 1, wherein the heater assembly is positioned within the heating unit at an oblique angle relative to a first direction of the first airflow through the first airflow path and a second direction of the second airflow through the second airflow path.

3. The heating unit of claim 1, wherein the partition has a substantially triangular profile.

4. The heating unit of claim 1, comprising a support rail, wherein the partition is configured to be fastened to the support rail, and wherein the partition has a gasket configured to abut the coil divider.

5. The heating unit of claim 1, wherein the outlet is formed in a base of the heating unit and is configured to output the comingled airflow in a direction crosswise to the length of the heating unit.

6. The heating unit of claim 1, wherein the outlet is formed in a lateral side of the heating unit and is configured to output the comingled airflow in a direction along the length of the heating unit.

7. The heating unit of claim 1, comprising a side panel configured to abut the second heating coil at a peripheral edge of the heater assembly, wherein the side panel is configured to direct the second airflow along the second airflow path and prevent bypass of the second airflow around the heater assembly.

8. The heating unit of claim 1, wherein the distance extends in a first direction crosswise to a second direction of the first airflow and the second airflow across the first heating coil and the second heating coil, respectively.

9. The heating unit of claim 1, wherein the coil divider comprises a first surface angled toward the first heating coil and a second surface angled toward the second heating coil.

10. A heating unit for a heating, ventilation and/or air conditioning (HVAC) system, comprising:

a first blower configured to direct a first airflow along a first airflow path through the heating unit;

a second blower configured to direct a second airflow along a second airflow path through the heating unit;

a heater assembly including a first heating coil positioned within the first airflow path, a second heating coil positioned within the second airflow path, and a coil divider extending for a distance from the first heating coil to the second heating coil to separate the first heating coil from the second heating coil such that the first heating coil and the second heating coil are separated from one another along a length of the heating unit by the distance, wherein the first heating coil, the second heating coil, and the coil divider are aligned with one another along the length of the heating unit;

a partition abutting the coil divider and separating the first airflow path and the second airflow path within the heating unit upstream of the heater assembly; and an outlet configured to discharge a comingled airflow comprising the first airflow directed across the first heating coil and the second airflow directed across the second heating coil from the heating unit.

11. The heating unit of claim 10, wherein the heater assembly is configured to be positioned within the heating unit at an oblique angle relative to a first direction of the first airflow through the first airflow path and a second direction of the second airflow through the second airflow path.

12. The heating unit of claim 10, wherein the partition has a substantially triangular profile.

13. The heating unit of claim 12, wherein a region of the substantially triangular profile of the partition is a curved region.

14. The heating unit of claim 10, wherein the partition is configured to separate the coil divider into a first portion of the coil divider proximate to the first heating coil and a second portion of the coil divider proximate to the second heating coil.

15. The heating unit of claim 14, wherein the first portion of the coil divider is angled toward the first heating coil and is configured to direct the first airflow toward the first heating coil, and the second portion of the coil divider is angled toward the second heating coil and is configured to direct the second airflow toward the second heating coil.

16. The heating unit of claim 10, wherein the outlet is disposed in a base of the heating unit, and wherein the heating unit is configured to discharge the comingled airflow in a vertically downward direction via the outlet in the base.

17. The heating unit of claim 10, wherein the outlet is disposed in a lateral side of the heating unit, and wherein the heating unit is configured to discharge the comingled airflow in a longitudinal direction along the length of the heating unit via the outlet in the lateral side.

18. A heating unit for a heating, ventilation and/or air conditioning (HVAC) system, comprising:

a heater assembly including a first heating coil positioned within a first airflow path through the heating unit, and a second heating coil positioned within a second airflow path through the heating unit, wherein the first heating coil and the second heating coil are aligned with one another along a length of the heating unit and extend along the length of the heating unit in a longitudinal direction crosswise to a first direction of airflow through the first airflow path and the second airflow path, and wherein the first heating coil and the second heating coil are separated from one another by a coil divider extending for a distance in the longitudinal direction from the first heating coil to the second heating coil;

a first blower configured to direct a first airflow toward the heater assembly in the first direction;

a second blower configured to direct a second airflow toward the heater assembly in the first direction;

a partition abutting the coil divider and separating the first airflow path and the second airflow path within the heating unit upstream of the heater assembly; and an outlet configured to discharge a comingled airflow comprising the first airflow directed across the first heating coil and the second airflow directed across the second heating coil from the heating unit in a second direction crosswise to the first direction.

19. The heating unit of claim 18, wherein the heater assembly is positioned within the heating unit at an oblique angle relative to the first direction of airflow through the first airflow path and the second airflow path.

20. The heating unit of claim 18, comprising a controller enclosure having processing circuitry configured to control operation of the heater assembly, wherein the controller enclosure is mounted to the heater assembly.

21. The heating unit of claim 20, wherein the heater assembly is mounted to the controller enclosure through an opening in a side panel of the heating unit.

22. The heating unit of claim 21, wherein the side panel of the heating unit abuts the first heating coil at a peripheral edge of the heater assembly and is configured to direct the first airflow through the first airflow path and to block bypass of the first airflow around the heater assembly.

23. The heating unit of claim 18, comprising an air deflector extending along the length of the heating unit in the longitudinal direction, wherein the air deflector is configured to direct the first airflow toward the first heating coil, the second airflow toward the second heating coil, or both.

24. The heating unit of claim 18, wherein the first blower and the second blower are positioned upstream of the heater assembly relative to the first direction of airflow through the first airflow path and the second airflow path.

25. The heating unit of claim 18, comprising a support rail, wherein the partition is mounted within the heating unit via the support rail.

\* \* \* \* \*